United States Patent
Wesenberg et al.

(10) Patent No.: US 11,161,520 B2
(45) Date of Patent: Nov. 2, 2021

(54) REDUNDANT MECHATRONIC SYSTEM

(71) Applicant: AUDI AG, Ingolstadt (DE)

(72) Inventors: André Wesenberg, Pfaffenhofen (DE); Michael Käßmeyer, Rain am Lech (DE)

(73) Assignee: AUDI AG, Ingolstadt (DE)

(*) Notice: Subject to any disclaimer, the term of this patent is extended or adjusted under 35 U.S.C. 154(b) by 154 days.

(21) Appl. No.: 16/687,912

(22) Filed: Nov. 19, 2019

(65) Prior Publication Data

US 2020/0189607 A1 Jun. 18, 2020

(30) Foreign Application Priority Data

Dec. 13, 2018 (DE) .................... 10 2018 132 148.1

(51) Int. Cl.
*F02D 41/22* (2006.01)
*B60W 50/023* (2012.01)
*B62D 5/00* (2006.01)

(52) U.S. Cl.
CPC .......... *B60W 50/023* (2013.01); *B62D 5/003* (2013.01); *F02D 41/22* (2013.01); *B60T 2260/02* (2013.01); *B60T 2270/404* (2013.01); *B60T 2270/82* (2013.01); *F02D 2041/226* (2013.01)

(58) Field of Classification Search
CPC ... B60W 50/023; B62D 5/003; B62D 5/0487; F02D 41/22; F02D 41/20; F02D 2041/226; F02D 2041/2079; F02D 2400/08; B60T 2270/404; B60T 2270/82; B60T 2260/02; B60R 16/03
USPC ..... 123/198 D; 701/107, 41, 42, 43; 307/52, 307/62, 69, 70; 180/6.2, 6.48, 6.5, 400, 180/412, 443
See application file for complete search history.

(56) References Cited

U.S. PATENT DOCUMENTS 9,590,553 B2   3/2017   Kanazawa et al.
9,985,567 B2 *   5/2018   Koseki ................ H02P 25/022

FOREIGN PATENT DOCUMENTS

DE   10 2004 051 078 A1   5/2006
DE   10 2008 014 876 B3   8/2009
DE   11 2014 006 003 T5   9/2016
(Continued)

OTHER PUBLICATIONS

Examination Report dated Oct. 4, 2019 in corresponding German application No. 10 2018 132 148.1; 18 pages.

*Primary Examiner* — Hai H Huynh

(74) *Attorney, Agent, or Firm* — Maier & Maier, PLLC

(57) ABSTRACT

A redundant mechatronic system. The redundant mechatronic system is formed with two channels and is or can be connected for the output of a varying mechanical power to a mechanical arrangement, wherein each of the two channels includes an energy supply and an actuation circuit or a common energy supply is connected upstream of both channels, and both channels can be controlled by at least one control unit. The control unit acts on the actuation circuits in such a manner that the actuation circuits in each case switch an electric power specified by the control unit and drawn from the energy supply through to in each case a winding set of at least one electrically operated actuator, in order to generate the mechanical power. The two channels are operated in parallel during normal operation, in such a manner that each channel provides half of the mechanical power to be instantaneously output.

8 Claims, 2 Drawing Sheets

(56) References Cited

FOREIGN PATENT DOCUMENTS

| | | |
|---|---|---|
| DE | 10 2016 221 250 A1 | 5/2018 |
| DE | 10 2017 110 753 A1 | 11/2018 |
| JP | 2017193197 A | 10/2017 |
| WO | 2016/173680 A1 | 11/2016 |
| WO | 2017/158680 A1 | 9/2017 |

* cited by examiner

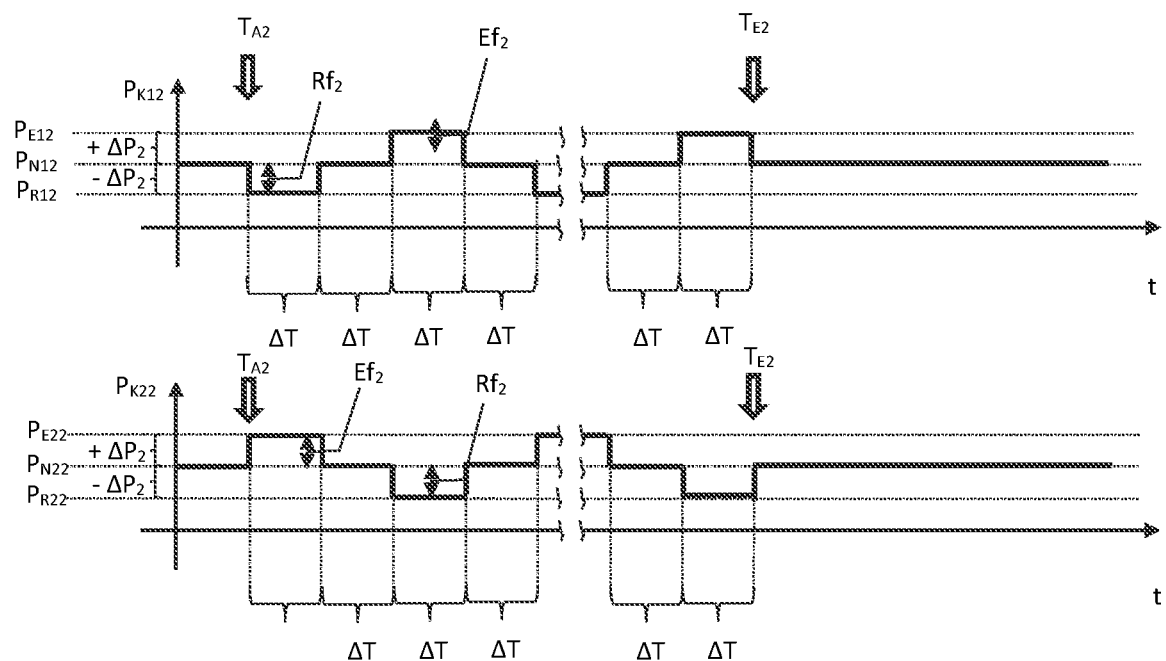

REDUNDANT MECHATRONIC SYSTEM

FIELD

The subject matter of the invention is a redundant mechatronic system according to the preamble of the main claim and a method for operating the redundant mechatronic system.

BACKGROUND

In general, a mechatronic system is considered to be the functional integration of a mechanical-electrical system, in which sensors receive signals, processors process information, and actuators are used in order to act on an often mechanical basic system. A mechatronic system accordingly usually has a mechanical basic structure. Sensors which detect the state of this basic structure and of the system environment transmit the signals to an information processing unit. There, the sensor signals are processed and control variables are generated according to established rules. Actuators use these control variables in order to influence the behavior of the mechanical basic system.

Such mechatronic systems are used in numerous technical fields, in particular also in motor vehicles. Here, an application exists, for example, in connection with so-called assistance systems and in connection with electrically controlled gas, brake and steering systems ("x by wire"). However, in such systems, in particular in the course of the recent development of autonomously or partially autonomously driving motor vehicles, the requirement of redundancy of such mechatronic systems arises.

In connection with electrically controlled gas, brake and steering systems ("x by wire"), in DE 2004 051 078 A1, a redundant mechatronic system of this type is described. From this publication it is known to form gas, brake and steering systems such that two spatially separate electric motors with two separate control units and two separate transmissions are used, which actuate the corresponding control element of the motor vehicle in parallel. Moreover, it is provided that, in the case of failure of one of the two electric motors, the other electric motor takes over 100 percent of its power. Here, it can be provided that both electric motors run simultaneously, such that, in the case of a functional failure of one of the servomotors, no additional switching times are necessary, since the other motor(s) of the group run(s) in parallel.

A similar redundantly designed mechatronic system is also described in DE 10 2008 014 876 A1 and WO2017158680A1.

The above-discussed redundant mechatronic systems have in common that, in the case of the occurrence of an error in a channel, they contain a backstop, in the way that they procure the entire required output power of the mechatronic system via the other channel. However, in most error cases, this is not necessary, because it is often only a matter of temporarily occurring overloads, such as, for example, an excess temperature on a component of the system, an excessively high current in an electrical component of the system, or an excessively high torque on a mechanical component of the system. In such cases, a switching off of the channel in question and only the load takeover by the other channel are not appropriate. Especially when only one subsystem is active, an overload and thus a total failure of the system, for example, as a result of a temperature overshooting, become more likely.

In connection with a steering system designed with one channel, with servo assistance, it is moreover known from JP2017193197 A to specify a first maximum current and a second smaller maximum current for driving the motorized component in the steering system, and to measure the temperature in the steering system by means of the control unit. If the temperature is below a predetermined temperature range, the first maximum current is approved as acceptable by the control unit; if the temperature is in the predetermined temperature range, the second maximum current is approved as acceptable by the control unit; and if the temperature is above the predetermined temperature range, the current is reduced to zero by the control unit, that is to say the servo assistance is switched off. Such a steering system can in fact manage a large portion of the excess temperatures that occur, without the servo assistance switching off completely, but this requires accepting a considerable loss of convenience, since the servo assistance falls back to a clearly perceivably lower level. Redundancy with regard to the servo assistance does not exist.

SUMMARY

While avoiding the above-discussed disadvantages of the prior art, the aim of the invention therefore is to indicate a two-channel redundant mechatronic system which remains capable of functioning in the case of temporarily occurring overloads and in which the load is distributed between both channels of the redundant mechatronic system in accordance with their respective instantaneous capability. The aim also includes indicating a method for operating such a redundant mechatronic system.

A redundant mechatronic system which is formed with two channels and is or can be connected for the purpose of the power supply to an electric energy supply, and which is or can be connected to a mechanical arrangement for the output of a mechanical power. The term mechatronic system is understood here to be a system of the type mentioned at the beginning. Such mechatronic systems exist, for example, electronically controlled gas, brake and steering systems and, in fact, both in servo systems assisting the driver of a vehicle and in autonomously or partially autonomously acting systems of a vehicle. Such systems contain in both channels one or more components in each case, and the power of each channel can be controlled by means of at least one control unit. As is conventional today, the control unit is a computer-assisted control which implements control and regulation procedures by control programs and which, for this purpose, communicates with the components, in that it applies control and/or regulation signals to said components and queries their states. The components can be energy supplies, simple or complex actuation circuits and actuators. The control unit acts on the actuation circuits arranged in each of the two channels, in such a manner that in each case the actuation circuits switches an electric power specified by the control unit and drawn from the energy supply through to a winding set of the at least one electrically operated actuator. Here the control unit is connected to arrangements which detect the failure of a channel. Both channels of the mechatronic system are operated in parallel during normal operation, in such a manner that each channel provides half of the instantaneous mechanical power to be output, and each of the two channels is formed such that it can provide at least the maximum required power for performing a function of the mechanical arrangement.

It is proposed that the mechatronic system is formed such that arrangements connected to the control unit are provided, by means of which overloads in the channels and/or the components of the channels and/or in the mechanical arrangement can be detected by the control unit. Overloads can be thermal overloads, as well as electrical and also mechanical overloads, which are detected with current, voltage, temperature, force or torque sensors or which, with the aid of computer models, reproduce the temporal course of the thermal, electrical or mechanical load in a control unit and thus detect an overload. Moreover, the control unit is formed such that, when an overload occurs, it detects this and determines a reduction factor which counteracts the overload and applies said reduction factor. The reduction factor is calculated here such that the system power available after the application of the reduction factor is sufficient to perform the function. Based on the reduction factor, the control unit controls the respective channel powers such that the respective instantaneous channel power counteracts the overload.

The redundant mechatronic system is moreover advantageously formed such that, by means of the control unit, in the case of the occurrence of an overload in one of the two channels and/or in one or more of the components in one of the two channels, it establishes a reduction factor such that, when it is applied by the control unit, the channel power is reduced in the overloaded channel by an amount defined by the reduction factor and increased in the non-overloaded channel by the same amount. The procedure can be cancelled in a predetermined time slot and carried out again. Overall, the continuous or alternating reduction of the channel power lasts until the control unit no longer detects an overload. Due to the described design of the redundant mechatronic system, it is advantageously achieved that, in the case of the occurrence of an overload in one of the two channels, the channel in question is protected, without switching it off completely. In the case of a thermal error, that is to say an excessively high temperature in a channel, this means that the channel in question is given the opportunity to cool due to the power reduction, while the other channel is only moderately heated, since it is operated within its specification.

An additional advantageous embodiment provides that, in the case of the occurrence of an overload in the mechanical arrangement, the redundant mechatronic system establishes the reduction factor by means of the control unit such that, when it is applied by the control unit, the power controlled by the control unit is reduced in one channel by an amount defined by the reduction factor and in the other channel it is increased by the same amount. This procedure is cancelled in a predetermined time slot and repeated with switching of the channels, overall until the control unit no longer detects an overload. By this procedure, an optimized thermal protection for the components of the channels and of the actuator is achieved, because they receive the opportunity to cool in an alternating manner.

In an additional advantageous embodiment of the redundant mechatronic system, it is provided that, when an overload occurs in both channels, a reduction factor for each channel can be established by means of the control unit, such that, when it is applied by the control unit, on the one hand, the power in both channels, controlled by the control unit, is reduced by an amount determined by the respective reduction factor. On the other hand, the reduction factors are calculated such that, when they are applied by the control unit, the instantaneously available system power, that is to say the power of both channels together, is sufficient to perform the function. The procedure can be cancelled in a predetermined time slot and carried out again. Overall, the continuous or alternating reduction of the channel power lasts until the control unit no longer detects an overload.

A development of the redundant mechatronic system advantageously provides for forming the channels such that each channel can provide the maximum necessary power for performing the function and such that both channels together can provide the power for performing an additional function of the mechanical arrangement. For this purpose, the control unit is formed such that, when an overload occurs, the additional function is deactivated at least when, due to the power reduction, the overall available system power is not sufficient to perform the function and the additional function. Additional function is here understood to mean that the function is carried out in a certain convenient manner. For example, if the function is a steering movement in the case of a vehicle at a standstill, then the additional function consists, for example, in performing the function in a predetermined short time. The performance of the function together with the additional function thus always requires more power than the performance of the function by itself.

An additional advantageous embodiment of the redundant mechatronic system provides for forming the control unit such that it determines the reduction factor as a function of type and/or degree of occurring overload. Thus, in a manner of speaking, a categorization of the overload is carried out, wherein the category of the overload determines the reaction of the redundant mechatronic system. In this manner, it is ensured that the system always reacts adequately to disturbances.

Since, in most cases, the power which a respective channel provides is determined from the current intensity via the actuation circuit of the actuator, the reduction of the power in a channel is brought about by a reduction of the current intensity for driving the associated actuator, and an increase of the power in a channel is brought about by an increase of the current intensity for driving the associated actuator, controlled by the control unit. In a pulsed actuation of the actuator, alternatively the possibility exists of bringing about the reduction of the power in a channel by a reduction of the pulse width of the current for driving the actuator, and the increase of the power in a channel is brought about by increasing the pulse width of the current for driving the actuator, controlled by the control unit.

For the optimized implementation of the basic function and optionally of the additional function, it is advantageous to form the system such that the control unit controls the actuation circuits in such a manner that, during the switching of a power from one channel to the other channel, the instantaneously necessary power is available at each switching time, that is to say without interruption. For this purpose, it can be provided that the switching occurs in the manner of an overlapping symmetric ramp function. This means here that, by the actuation circuit of the one channel the current decreases in the shape of a ramp by a predetermined amount, while, at the same time, the current in the other channel increases in the shape of a ramp by the same amount.

The redundant mechatronic system can advantageously be used as a portion of a servo steering system assisting the steering of a driver, a steer-by-wire system, or, in the case of an autonomously driving vehicle, as a portion of the steering system in such a vehicle. The last-mentioned system autonomously performs the steering movements, controlled by a vehicle computer without steering intervention of a driver. Naturally, the possibility also exists of using the redundant mechatronic system, for example, as a servo brake system, a brake-by-wire system, brake system in an autonomously driving vehicle, a servo gas system, electronic gas pedal, a gas system in an autonomously driving vehicle, or, outside of vehicle technology, in other technical fields.

A method for operating the redundant mechatronic system advantageously provides that the control unit cyclically queries the arrangements for the detection of overloads in the channels and/or in the mechanical arrangement. As mentioned above, the arrangements for the detection of overloads can likewise be sensors or computer models reproducing the load situation. If an overload occurs in one of the channels, the control unit establishes a reduction factor for the channel in question and, with the assistance of the reduction factors, determines a reduction variable for the instantaneous channel power of the overloaded channel. For example, if the current intensity is the variable to be determined for the power, the reduction variable is a variable by which the current intensity is to be reduced. By corresponding actuation of the actuation circuit by means of the control unit, the reduced power is switched onto the winding system which is connected to the actuation circuit. The actuator can be, for example, a double motor in which, in each case, a winding system is associated with a channel. Naturally, two independent motors are also conceivable, which act on a common drive train and which, together with said drive train, form the actuator. Since, due to the power reduction in the overloaded channel, the system power is not sufficient for performing the function, the control unit, with the assistance of the reduction factor, determines an increase variable for the non-overloaded channel, wherein the increase variable in terms of amount corresponds to the reduction variable and, by the actuation of the actuation circuit, it switches the power increased by the increase variable on the winding system of the actuator which is connected to the actuation circuit. The power reduction in one channel and the power increase in the other channel can be carried out continuously or repetitively in a time slot and it is stopped by the control unit when said control unit no longer detects an overload.

In a channel-based overloading, the method makes it possible to perform the function without problem by reducing the load on the overloaded channel, without switching off the overloaded channel. This also has an advantageous effect on the thermal state of the non-overloaded channel, since said over non-overloaded channel does not need to be operated under full load at its specification limit.

An additional method aspect for the operation of the redundant mechatronic system provides that the control unit cyclically queries the arrangements for the detection of an overload in the channels and/or in the mechanical arrangement. Here too, as mentioned above, it is true that, the arrangements for detecting overloads can be sensors or computer models reproducing the load situation. If the control unit detects an overload in the mechanical arrangement, it establishes a reduction factor for both channels. This reduction factor is the same for both channels. Thus, the control unit, starting in one of the channels, performs a reduction of the channel power from the channel power provided for performing the function, in that it determines from the reduction factor a reduced power and, by corresponding actuation of the actuation circuits, it switches the reduced power onto the winding system of the actuator, which is connected thereto. At the same time, the control unit derives from the reduction factor an increased power in that, starting from the channel power provided for performing the function, it applies, for example, the reduction factor with opposite mathematical sign. Then, by corresponding actuation of the actuation circuits, the control unit switches the increased power onto the winding system of the actuator, which is connected thereto. Within a predetermined time, the control unit cancels the change again and performs the change again in a predetermined time slot with a switch of the channels. The procedure is repeated by the control unit as long as the overload is detected.

By means of the above method, it is advantageously achieved that, when a temporary overload occurs, the channel utilization occurs asymmetrically. In practice, this means that the redundant mechatronic system can be operated independently of the type of occurring temporary overload in a thermally safe range.

In a development of the above-described method, it can be provided that, in the case of the occurrence of an overload, the control unit checks whether, after performed power reduction, both channels together can provide the power for the function and additionally the power for performing an additional function of the mechanical arrangement. In order to determine the performability of the additional function, the control unit compares the instantaneously necessary total system power of the two channels of the mechatronic system with the system power which is in fact available after the power reduction. When the necessary total system power exceeds the available system power, the control unit deactivates the additional function, otherwise it performs the additional function. Thereby, it can be achieved that the additional function can be performed in many cases in spite of an overload of a channel or of the mechanical arrangement.

When the reduction factor is mentioned above, this term is to be understood not only in the mathematical sense. A reduction factor can be a factor, a percentage, an amount or a mathematical or empirical function.

As can be seen from the above, the proposed redundant mechatronic system is capable of adequately handling the occurrence of temporary overloads and also the complete failure of a channel.

BRIEF DESCRIPTION OF THE DRAWINGS

Additional embodiments and advantages of the invention are explained in greater detail below in reference to the drawings. In the drawings:

FIG. 3 shows a diagrammatic representation of a second operating principle of the redundant mechatronic system

DETAILED DESCRIPTION

Figure 1:
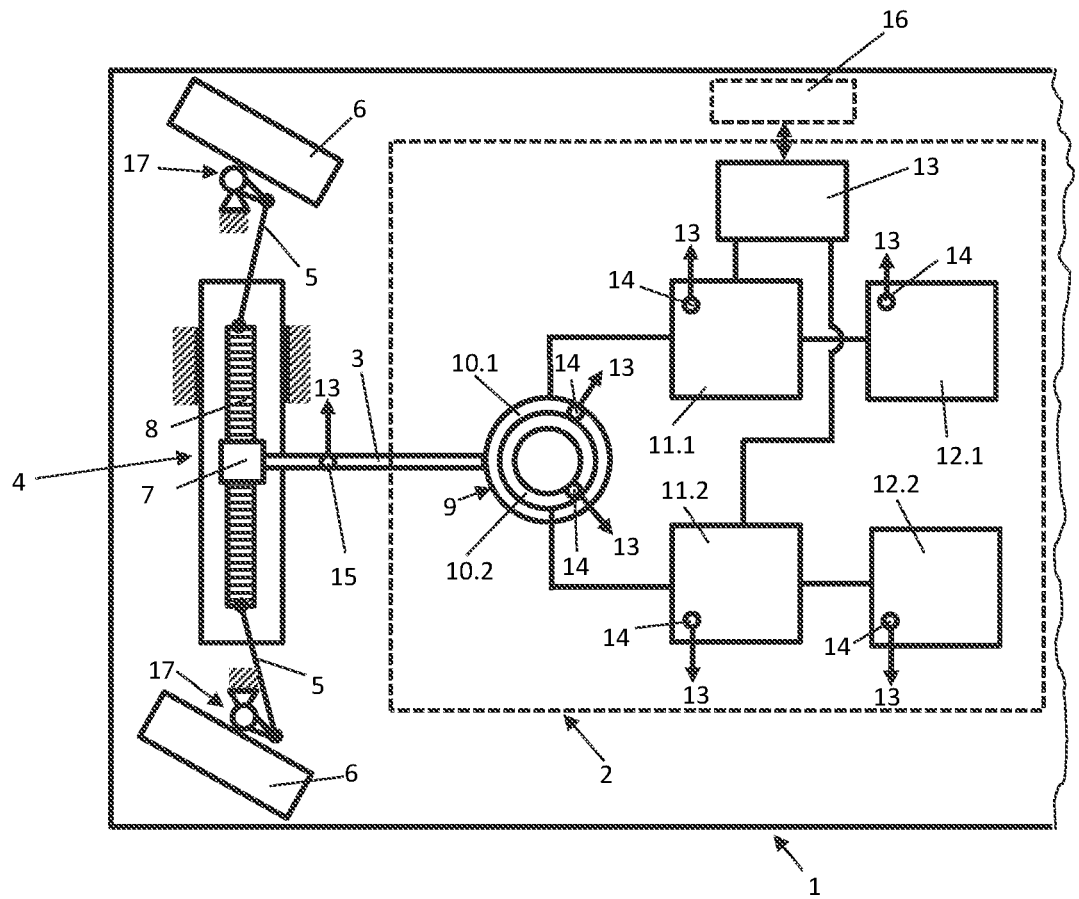
FIG. 1 shows an autonomous steering system with a redundant mechatronic system as drive in a motor vehicle (simplified partial representation)

FIG. 1, in a simplified representation, shows an autonomous steering system in a motor vehicle 1 (partial representation). Represented is a redundant mechatronic system 2 which drives a vehicle steering 4 via a drive shaft 3. Said vehicle steering consists of a pinion 7 driven by the drive shaft 3, and acting on a toothed rod 8. The toothed rod 8 in turn acts on the tie rods 5 which are hinged at both ends of the toothed rod 8. The tie rods 5 are rotatably mounted by their second end on steering levers of the wheel suspension 17 and transfer the movements of the toothed rod 8 to the steered wheels 6 attached on the wheel suspension 17.

The redundant mechatronic system 2 comprises two channels, wherein the first channel consists of a first energy supply 12.1, of a first actuation circuit 11.1 and of a first winding set 10.1 of a double electric motor 9. The second channel analogously consists of a second energy supply 12.2, of a second actuation circuit 11.2 and of a second winding set 10.2 of the double electric motor 9. The double electric motor 9 has only one drive with which it drives the drive shaft 3. The redundant mechatronic system 2 is controlled by a control unit 13 which is connected by control technology to the first actuation circuit 11.1 of the first channel and to the second actuation circuit 11.2 of the second channel. The control unit 13 is moreover connected to an external vehicle computer 16 and has connections to sensors 14 one of which in each case is associated with each of the energy supplies 12.1, 12.2, each of the actuation circuits 11.1, 11.2 and each of the winding sets 10.1, 10.2 of the double electric motor 9 and picks up their temperature, such that a thermal overload can be detected separately in a component-based manner in each of the two channels. The torque sensor 15 picks up a measured value for the torque on the drive shaft 3 and is also connected to the control unit 13. By means of the torque sensor 15, an overload in the steering itself can be detected. As explained above, the redundant mechatronic system 2 is designed such that each of the two channels, in the case of failure of the other channel, can completely take over the performance of the function (in the example, the performance of a steering movement) in each case.

For the additional explanation of the operating principle of the redundant mechatronic system 2, it is first assumed that a temperature has built up in the first actuation circuit 11.1, which represents a thermal overload. The control unit 13, which during the operation of the arrangement cyclically queries the sensors 14, 15, detects this state as an overload in the first channel.

The reaction to the detection of the overload is subsequently explained in greater detail with the aid of FIG. 2. For this purpose, in the representation, the power course in the two channels is shown. The upper representation in FIG. 2 shows the power course $P_{K1}$ in the first channel and the lower representation in the drawing shows the power course $P_{K2}$ in the second channel, in each case with respect to time t.

In reaction to the detection of the above-discussed overload at time TA, the control unit 13 establishes a reduction factor Rf, which is 40% in the example, based on the type (excess temperature in the first actuation circuit 11.1) and optionally on the level of the excess temperature, when a corresponding temperature measurement is provided. Starting from the power $P_{N1}$ necessary at this time for performing the function, the control unit 13 reduces this power $P_{N1}$, with the assistance of the reduction factor Rf, by the power $\Delta P$ to the reduced power $P_{R1}$, in that it correspondingly reduces the current intensity flowing via the actuation circuit 11.1. At the same time, the control unit, applying the reduction factor Rf with opposite mathematical sign, determines an increase factor Ef for the second channel and increases the power $P_{N2}$ necessary at this time for performing the function by the power $\Delta P$ to the increased power $P_{E2}$, in that it correspondingly increases the current intensity which the actuation circuit 11.2 applies to the second winding system 10.2. The above described state is maintained until the control unit, at time $T_E$, by querying the sensor 14, no longer detects an elevated temperature in the actuation circuit 11.1.

Figure 2:
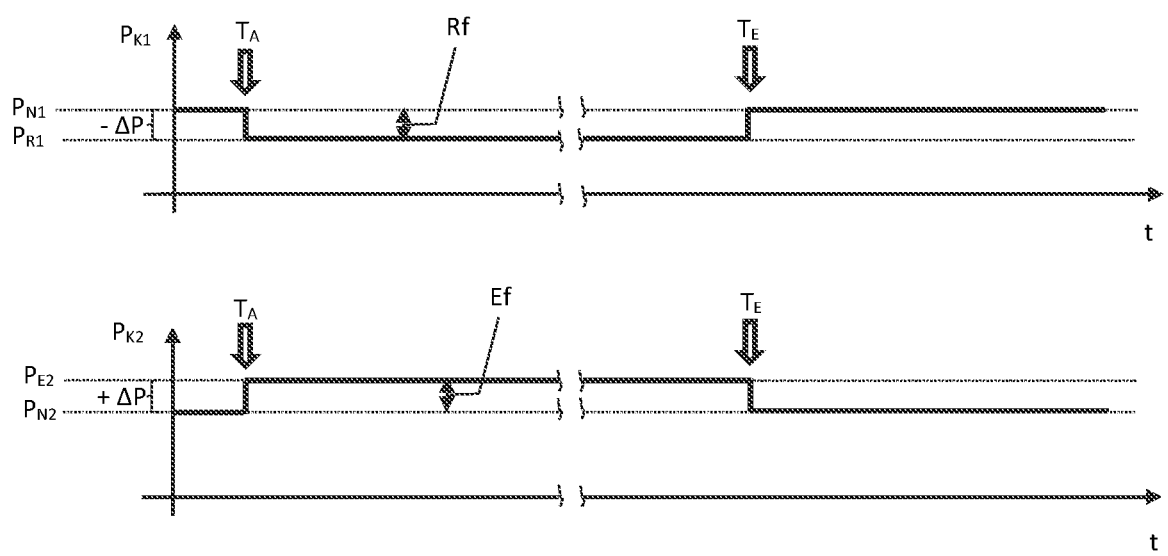
FIG. 2 shows a diagrammatic representation of a first operating principle of the redundant mechatronic system

As can be seen from FIG. 2, the necessary power reduction in the first channel due to the thermal overload of the first actuation circuit 11.1 is completely compensated by the power increase in the second channel. The first actuation circuit as a result receives the opportunity to cool, while the components in the second channel are only insignificantly heated, since the second channel is operated within its specification.

FIG. 3 shows an additional example of the operating principle of the redundant mechatronic system. For this purpose, in this case as well, the power course in the two channels is shown in the representation. In FIG. 3, the upper representation shows the power course $P_{K12}$ in the first channel and the lower representation in the drawing shows the power course $P_{K22}$ in the second channel, in each case with respect to time t.

In this example, it is assumed that the control unit 13 detects an excessively high torque at time $T_{A2}$ via the torque sensor 15. An excessively high torque can be caused, for example, when the steered wheels are on a supporting surface which strongly impedes a steering movement and a steering movement is carried out when the vehicle is standing still.

In reaction to the detection of the above-discussed overload at time $T_{A2}$, the control unit 13 establishes a reduction factor $Rf_2$, which is 50% in the example, based on the type of overload (overshooting of torque in the steering). Starting from the power $P_{N12}$ necessary at this time for performing the function, the control unit 13 reduces this power $P_{N12}$, with the assistance of the reduction factor $Rf_2$, by the power $\Delta P_2$ to the reduced power $P_{R12}$, in that it correspondingly reduces the current intensity flowing via the actuation circuit 11.1. At the same time, applying the reduction factor $Rf_2$ with opposite mathematical sign, the control unit determines an increase factor $Ef_2$ for the second channel and it increases the power $P_{N22}$ necessary at this time for performing the function by the power $\Delta P_2$ to the increased power $P_{E22}$ in that it correspondingly increases the current intensity which the actuation circuit 11.2 applies to the second winding system 10.2. After the elapse of the time $\Delta t$, the control unit 13 reverses the change performed, and, after the elapse of a time $\Delta t$, the control unit again performs the changes with switching of the channels, such that now the power $P_{N12}$ in the first channel is increased by the power $\Delta P_2$ to the increased power $P_{E22}$, and the power $P_{N22}$ in the second channel is reduced by the power $\Delta P$ to the reduced power $P_{R22}$. The above-described procedure is repeated until the control unit 13, by querying the torque sensor 15, at time $T_{E2}$, does not detect an increased torque.

In contrast to the example described in connection with FIG. 3, one can also proceed in such a manner that the control unit 13 establishes the increase factor $Ef_2$ to be higher than the reduction factor $Rf_2$. Thereby, the system power is increased in a pulsed manner, such that a possible obstacle impeding the steering movement can be overcome. The increase factor $Ef_2$ can here be increased at most until the maximum channel power is reached.

In conclusion, it should be pointed out that, in the examples according to FIG. 2 and FIG. 3, for reasons having to do with the representation, the power $P_{N1}$ necessary for performing the function was assumed to be constant; however, this does not have to be the case. Instead, it is likely that the power $P_{N1}$, $P_{N12}$ necessary for performing the function varies, since, depending on the situation, the steering movements predetermined by the vehicle computer 16 also vary. In this case, the power reductions $-\Delta P$, $-\Delta P_2$ or power increases $+\Delta P$, $+\Delta P_2$ naturally also vary.

The invention claimed is:

1. A redundant mechatronic system, comprising:
   two channels which are or can be connected to a mechanical arrangement for the output of a mechanical power, and at least one control unit, wherein each of the two channels comprises an energy supply connected upstream of both channels and an actuation circuit which is controllable by the at least one control unit, wherein the at least one control unit acts on the actuation circuits such that each of the actuation circuits switch an electric power specified by the control unit and drawn from the energy supply through to a winding set of at least one electrically operated actuator, thereby generating the mechanical power, wherein, during normal operation, the two channels are operated in parallel such that each channel instantaneously provides half of the mechanical power required for performing a function of the mechanical arrangement, wherein each of the two channels are configured to be individually capable of providing all of the mechanical power required for performing the function, wherein the redundant mechatronic system further comprises sensors connected to the control unit, by which overloads in the redundant mechatronic system can be detected, wherein, when an overload is detected, a reduction factor counteracting the overload is established and applied by the control unit, wherein the electric power of each of the two channels is, with the reduction factor, controlled by the control unit to counteract the overload, wherein the reduction factor is calculated such that, when the reduction factor is applied by the control unit, a sum power of both channels is sufficient for performing the function, wherein the function comprises a mandatory power component required to execute the function and a convenience power component, separate from the mandatory power component, which enhances performance of the function during normal operation, wherein, when the overload is detected, operability of enhancements provided by the convenience power component is deactivated if, while the reduction factor is applied, the sum power of both channels is insufficient to satisfy requirements of both the mandatory power component and the convenience power component, wherein, when the overload is detected in the mechanical arrangement, the reduction factor is applied to a first of the two channels to reduce power transmission and a second of the two channels to increase power transmission, and wherein the at least one control unit alternates, in an oscillatory manner, which of the two channels have increased or decreased power transmission.

2. The redundant mechatronic system according to claim 1, wherein, when the overload is detected in the first of the two channels, the reduction factor is applied in the first channel to reduce power transmission by a defined amount and the reduction factor is applied in the second of the two channels to increase power transmission by the defined amount.

3. The method for operating the redundant mechatronic system according to claim 2, wherein the at least one control unit:

cyclically queries the sensors in order to detect overloads in the two channels and/or in the mechanical arrangement, establishes the reduction factor for both channels when the overload is detected in the mechanical arrangement, for a first of the two channels, determines a reduced power with the reduction factor and, by corresponding actuation of the actuation circuit of the first channel, switch the reduced power onto a winding system of the actuator, which is connected to the actuation circuit of the first channel, simultaneously with the first of the two channels, for a second of the two channels, determines an increased power with the reduction factor and, by corresponding actuation of the actuation circuits of the second channel, switch the increased power onto a winding system of the actuator, which is connected to the actuation circuit of the second channel, oscillates the reduced power and the increased power between the first and second channels over the course of a predetermined period as long as the overload is detected.

4. The redundant mechatronic system according to claim 1, wherein, when the overload is detected in both channels, a unique reduction factor for each channel is determined and applied to reduce power transmission in both channels, and wherein the at least one control unit alternates, in an oscillatory manner, which of the unique reduction factors are applied to each of the two channels.

5. The redundant mechatronic system according to claim 1, wherein the at least one control unit determines the reduction factor as a function of a type of the overload.

6. The redundant mechatronic system according to claim 1, wherein the redundant mechatronic system is part of a servo steering system, a steer-by-wire system, or a steering system of an autonomously driving vehicle.

7. A method for operating the redundant mechatronic system according to claim 1, wherein the at least one control unit:

cyclically queries the sensors in order to detect overloads in the two channels and/or in the mechanical arrangement, establishes the reduction factor when the overload is detected in one of the two channels, determines, with the reduction factor, a reduction variable for an instantaneous channel power of an overloaded channel, and, by corresponding actuation of the actuation circuits, switch a reduced power onto a winding system connected to the actuation circuit of the overloaded channel, determines, with the reduction factor, an increase variable having corresponding magnitude to the reduction variable, for an instantaneous channel power of a non-overloaded channel, and, by corresponding actuation of the actuation circuits, switches an increased power onto a winding system connected to of the actuation circuit of the non-overloaded channel, and maintains adjusted channel power as long as the overload is detected.

8. The redundant mechatronic system according to claim 1, wherein the at least one control unit determines the reduction factor as a function of a degree of the overload.

\* \* \* \* \*